Oct. 10, 1967

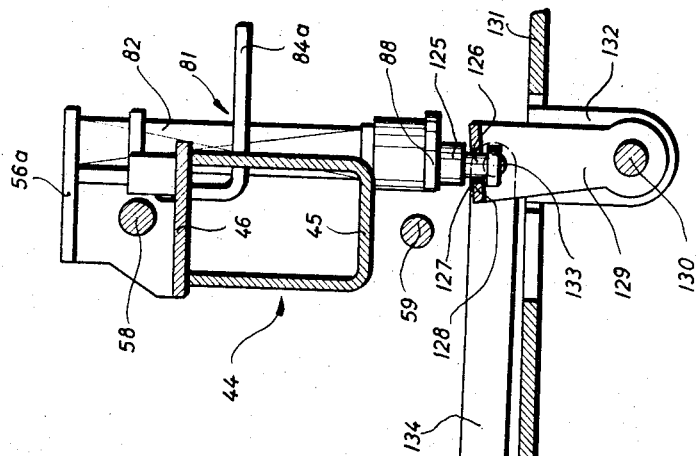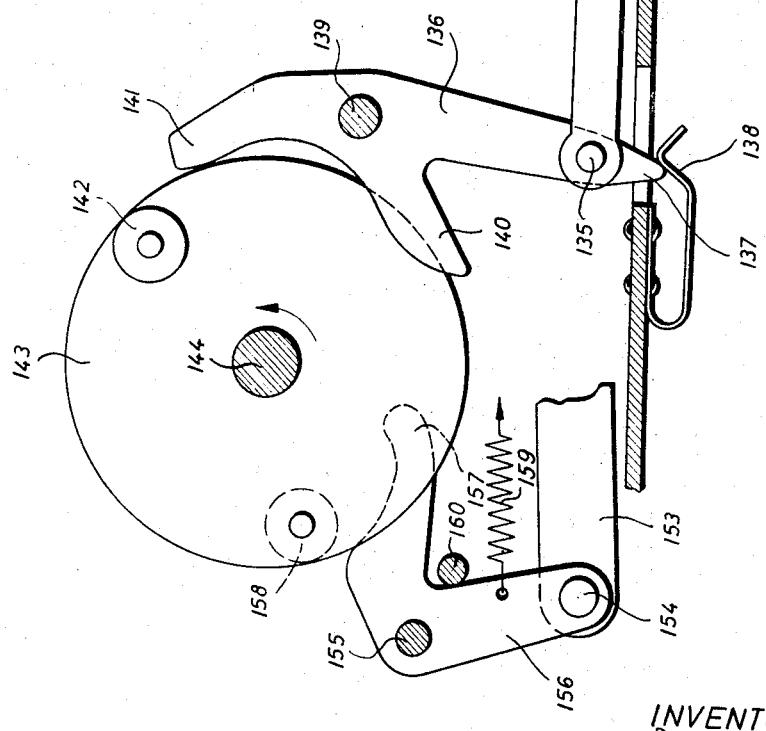
Fig.6

P. THEVIS 3,346,178

APPARATUS FOR CARRYING OUT SHORTENED MULTIPLICATIONS IN CALCULATORS

Filed April 29, 1965

INVENTOR
Paul Thevis

BY: Michael S. Striker
ATTORNEY 3,346,178
APPARATUS FOR CARRYING OUT SHORTENED MULTIPLICATIONS IN CALCULATORS
Paul Thevis, Oberndorf, Germany, assignor to Olympia Werke AG, Wilhelmshaven, Germany
Filed Apr. 29, 1965, Ser. No. 452,026
Claims priority, application Germany, Oct. 24, 1964, O 10,465
37 Claims. (Cl. 235—60)

ABSTRACT OF THE DISCLOSURE

Groups of counter elements determined by the digital positions of the register elements of the multiplier register of a ten-key calculator abut abutment portions of the register elements. Sensing means sense the position of the abutment portions and control a result register to perform additive or subtractive operations, respectively, when sensing digital positions corresponding to the digits from one to four and the digits from five to nine, respectively. A counter counts the number of abutting counter elements in each ordinal position of the same for causing a corresponding number of additive or subtractive operations of the register so that a shortened multiplication is carried out.

Background of the invention

In standard calculators, a multiplicand, for example 120 is multiplied by a multiplier, for example 698 by adding 120 eight times according to the digit in the unit order of the multiplier, then nine times according to the second decimal order, and then six times according to the third decimal order of the multiplier. This requires at least twenty-three operations of the calculator, consuming a great detal of time and causing high wear of the many moving parts involved in the repeated additions.

A shortened multiplication requires fewer operations since additions of the multiplicand are only carried out for digits of the multiplier below five. If the digits of an order of the multiplier are at least five, or above five, the multiplicand is subtracted a number of times corresponding to the complements of the multiplier digits, based on the basis ten. In order to arrive at a correct result, an addition must be carried out in the next higher order, corresponding to a multiplication of the multiplicand with 10 if a subtraction was carried out in the unit order, with 100 if the subtraction was carried out in the second decimal order, and so forth. In the above stated numerical example, two subtractions are carried out in the unit order of the multiplier, no calculation is carried out in the second decimal order since 9+1=10, three subtractions are carried out in the third decimal order since 6+1=7, and one addition is carried out in the fourth decimal order since 0+1=1. Altogether, six calculating operations of the machine are required as compared with twenty-three operations in the case that the multiplication is carried out by additions only.

The number derived in this way from a multiplier is sometimes referred to as a "working off number." In the above example, this number is 302.

It is immaterial whether the orders of the multiplier are worked off starting with the lowest order or with the highest order during a standard multiplication, and correspondingly it is immaterial whether in a shortened multiplication, the "working off number" is worked off starting with the highest or lowest order.

Calculating apparatus for carrying out shortened multiplications is known. First the multiplier and then the multiplicand are entered into the calculator, and means are provided to find the "working off number" of the multiplier to carry out the necessary calculating operations based on the "working off number," and to enter the multiplicand as an additive or subtractive value into a result register, depending on whether the respective order of the multiplier is a positive value, or a negative complement value.

In a known calculator, the multiplier is transformed during the entry into the register elements of a multiplier register. If the digit of an order of the multiplier is higher than five, the register element of the next higher order is shifted one step. If the digit nine is entered, for example, the respective register element stores nine, and the register element of the next higher order stores a unit. When the number is entered into the multiplier register, the first order causes a negative, and the second order causes a positive machine operation.

A disadvantage of this prior art construction is that the multiplier register does not store the real value of the multiplier, so that the same is not available for later calculating operations. If the multiplier is to be used again for another calculation, or is to be printed, the register elements of the multiplier register must be operated to store the real digits of the multiplier instead of partly the real digits and partly digits increased by a unit.

Summary of the invention

It is one object of the invention to overcome this disadvantage of known apparatus for carrying out shortened multiplications, and to provide apparatus for carrying out a shortened multiplication with a multiplier whose real value is stored in the multiplier register.

Another object of the invention is to provide an apparatus for shortened multiplication permitting the printing of the multiplier and its use for other calculating operations, after a shortened multiplication has been carried out.

Another apparatus for carrying out shortened multiplications provides a storing means for the multiplier including a stepped member with steps corresponding to the real digits and other steps corresponding to the complements, and this member is sensed. A disadvantage of this apparatus is that the sensing must be carried out in a direction perpendicular to the movement of the sensing slide, and that every order must be sensed. For example, while for a multiplier 9,999,999 a negative calculated out in orders in which no value has to be added, orders must be sensed while the result register is rendered inoperative. Only after the last digit nine, the counter is shifted to an additive operation. Since an operation has to be carried out also in this order, eight operations are required.

It is another object of the invention to overcome this disadvantage, and to provide apparatus for carrying out a shortened multiplication in which no operation is carried out in orders in which no value has to be added, or subtracted respectively. Another object of the invention is to provide an apparatus for carrying out shortened multiplication which requires a minimum of additive or subtractive machine operations.

With these objects in view, the present invention relates to a new apparatus for controlling shortened multiplications in a calculator, preferably in a ten-key calculator. One embodiment of the invention comprises a multiplier register including an ordinal series of register elements having abutment portions; a set of counter elements, preferably mounted on a multiplication carriage, and being movable with the same between a plurality of ordinal positions in which groups of the counter elements determined by the digital positions of the register elements, by the width of the abutment portions, and by the spacing of the counter elements abut the abutment portions; and counter means for counting in each of the ordinal positions of the multiplication carriage the number of counter elements abutting the respective abutment portion. A sensing means is provided which is responsive to the positions of the abutment portions to cause additive or subtractive calculating operations depending on whether the digit stored in a register element is a lower digit which may be directly added, or a higher digit whose complement is to be subtracted to reduce the number of necessary machine operations.

The multiplication carriage moves in a direction parallel to the axis of rotation of the register elements, and transverse to the abutment portions. The counter elements are preferably counter levers or pawls turnably mounted on shiftable support members, respectively.

The width of the abutment portions, or more particularly the circumferential extension of each abutment portion of a turnable register element and the spacing between the counter elements are selected so that the maximum number of abutting counter elements corresponds to the maximum number of operations of the result register.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2a is a fragmentary perspective view illustrating a detail of the embodiment of FIG. 2;

FIG. 6 is a fragmentary vertical sectional view of the apparatus, certain parts being omitted for the sake of simplicity;

Figure 1:
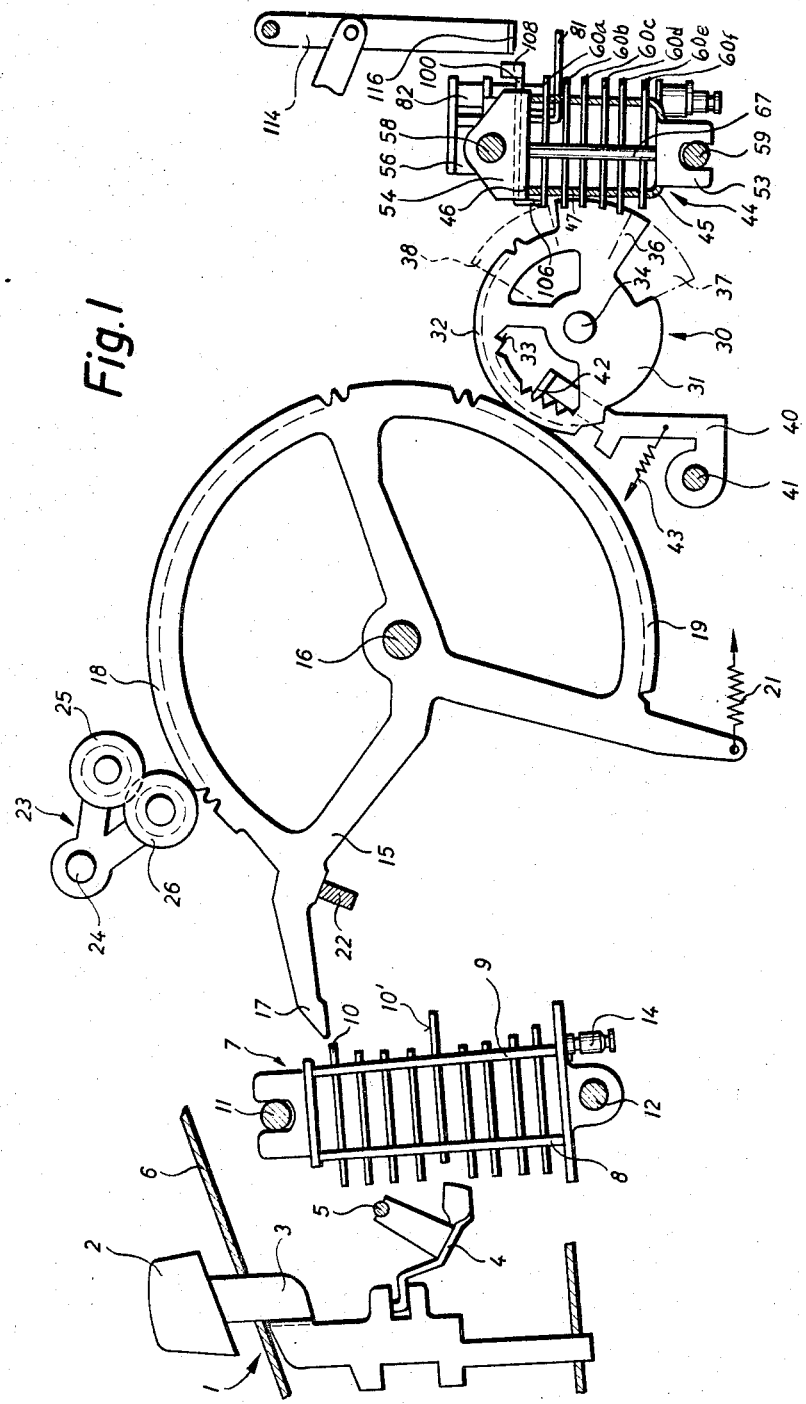
FIG. 1 is a fragmentary side elevation, partially in section, illustrating the apparatus of the invention provided in a ten-key calculator.

Referring now to FIG. 1, which illustrates a ten-key calculator to which the apparatus of the present invention is added, a digit key, which is one of the ten keys of the keyboard, has a stem 3 mounted in a cover plate 6 for vertical movement, and controls a rockable member 4 mounted on a pivot 5 so that upon depression of key 2, a pin 10 of a pin carriage 7 is displaced to a set position 10′ representing the respective digit in the respective order. A row of pins 10 is associated with each order, and all pins are mounted in parallel walls 8 and 9 of the pin carriage which is guided on rails 11 and 12 for stepwise movement so that the pin carriage performs one step after each actuation of a digit key 2. A spring, not shown, is secured to a projecting stud 14 for urging the pin carriage to move in one direction.

An ordinal set of transfer members 15 is mounted for turning movement on a shaft 16, and each transfer member is urged by a spring 21 to turn in counterclockwise direction. A stop bar 22 extends across all transfer members 15 and holds the same in the illustrated inoperative position until an operational cycle of the machine is started which causes stop bar 22 to move away from all transfer members 15 which are urged by springs 21 to assume sensing positions abutting set pins 10′ of pin carriage 7 so that the angular positions of transfer members 15 represent the digits stored in the pin carriage. FIG. 1 shows pin 10 representing the digit 4 in the set position 10′.

Each transfer member 15 has a first peripheral gear portion 18 and a second peripheral gear portion 19. A result register 23 can be turned in a known manner about a shaft 24 between two positions in which the positive register gears 25 or the negative register gears 26 mesh with gear portion 18.

A multiplier register 30 includes in the usual manner a set of ordinal register gear elements 31 which are mounted for free turning movement on a shaft 34. Each register gear element 31 has a peripheral gear portion 32, and the entire register 30 can be moved by conventional means, not shown, between a position in which gear portions 32 mesh with gear portions 19, as shown in FIG. 1, and an inoperative position in which the gears do not mesh.

During the first part of an operational cycle of the machine, the transfer members 15 are turned to the digital sensing positions, and during the second part of the operational cycle, bar 22 is raised and turns transfer members 15 while the same are in meshing engagement with register gear elements 31 whereby the same are turned different angles representing digits, and register the numerical value previously entered into the pin carriage 7, for example the multiplier which is to be used for a shortened multiplication. Thereupon, the keys 2 are again operated to store the multiplicand in the pin carriage, while register key elements 31 are moved away from transfer members 15.

In accordance with the present invention, the multiplier remains stored in the multiplier register 30, and in order to assure that the register gear elements 31 are not angularly displaced, they are locked by a locking member 40 which is urged by a spring 43 to turn about shaft 41 and has a locking bar extending through cutouts in all register elements 31 and locking the same by engaging notches 33 in the outer edges of the cutouts. Before register 30 is cleared in a conventional manner, member 40 is turned in counterclockwise direction to release register gear elements 31.

In accordance with the invention, each register gear element 31 has a radially projecting abutment portion 36 whose width or circumferential extension is in a selected relationship with the angle which each register element turns between two digital positions representing successive digits. The circumferential extension of each abutment portion 36 corresponds to the maximum number of calculating operations in each order of the multiplier.

In the illustrated embodiment, no more than five operations are carried out for each order of the multiplier. In accordance with the illustrated embodiment, multiplier digits from zero to four cause multiplications in the form of repeated additions, corresponding to a conventional multiplication operation, while multiplier digits between five and nine are used for shortened multiplications by repeatedly subtracting a complement value. The position of abutment projection 36 shown in solid lines corresponds to the digit four stored in the respective order by the register gear element 31. If a register element is in a position storing the digit zero, the abutment projection is in the position 37 shown in dash and dot lines. If a register element stores the digit nine, the abutment projection is in the position 38 shown in broken lines.

The abutment projections cooperate with counter elements which are schematically shown in FIG. 1 to have six counter pawls 60a to 60f. The counter pawls are spaced from each other distances corresponding to angular steps of register gear elements 31 between digital positions so that, for example, in the illustrated position four counter pawls project into the region of the abutment portion 36, that no counter pawl projects into the region of an abutment portion 37 in the zero position of the respective register gear element 31, and that one counter pawl projects into the region of an abutment portion 38 whose register gear element is in a digital position representing the digit nine. Counter pawls 60a to 60f are mounted on a multiplication carriage 44 which has a U-shaped support structure including front and rear walls 46, 47, a bottom wall 45, and a top wall 46, as also shown in FIGS. 2 to 9.

Figure 5:
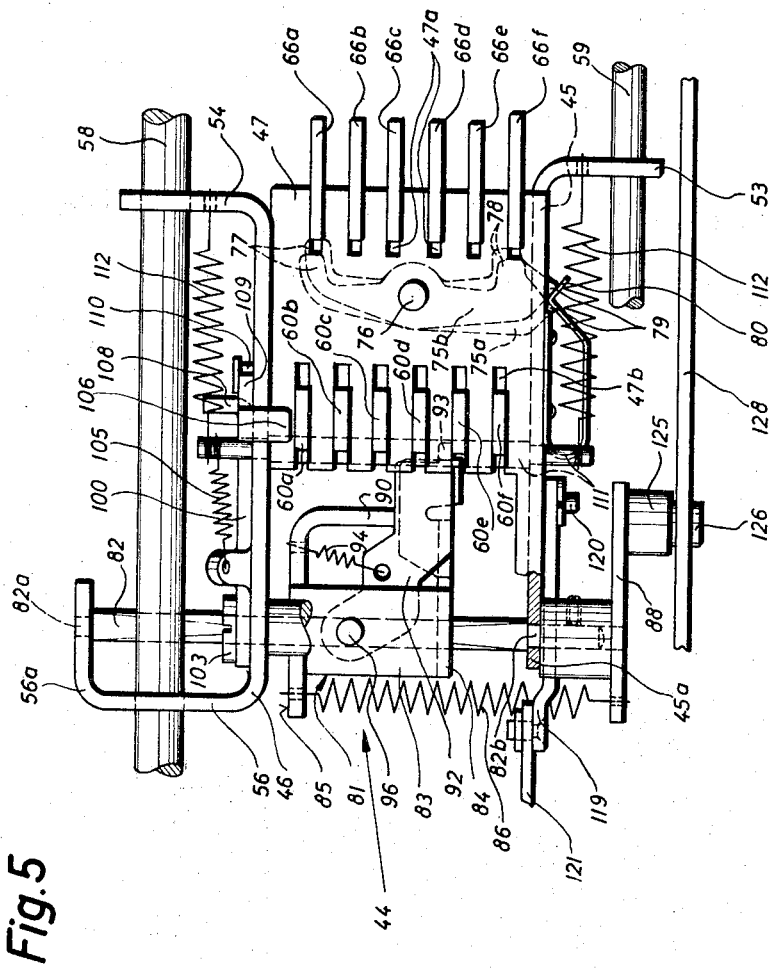
FIG. 5 is a fragmentary front view illustrating the apparatus.

As best seen in FIG. 5, a lug 53 of bottom plate 45 is mounted for sliding movement on a rail 59, and two lugs 54, 56 of top plate 46 slide on a second rail 58 so that the multiplication carriage 44 is mounted for movement parallel to the axis of shaft 34 of the multiplier register.

Figure 3:
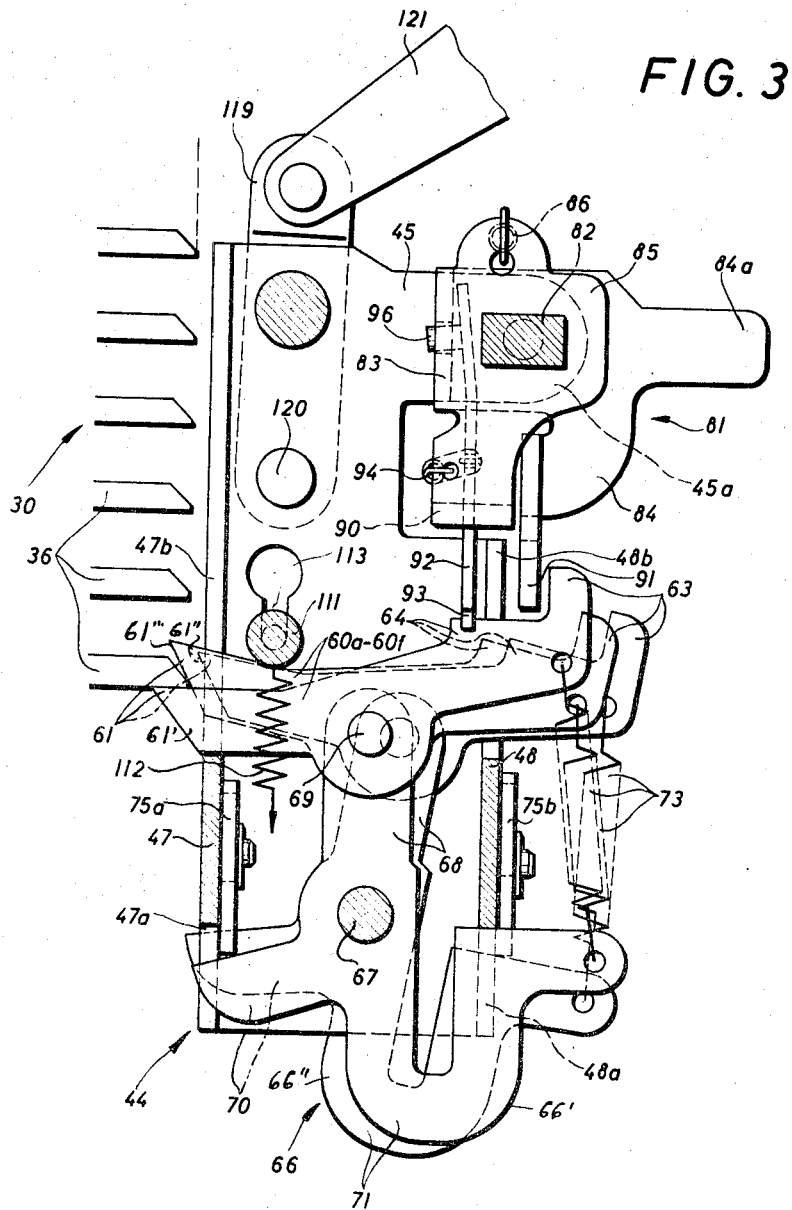
FIG. 3 is a fragmentary horizontal sectional view illustrating the multiplier carriage shown in FIG. 2.
Figure 4:
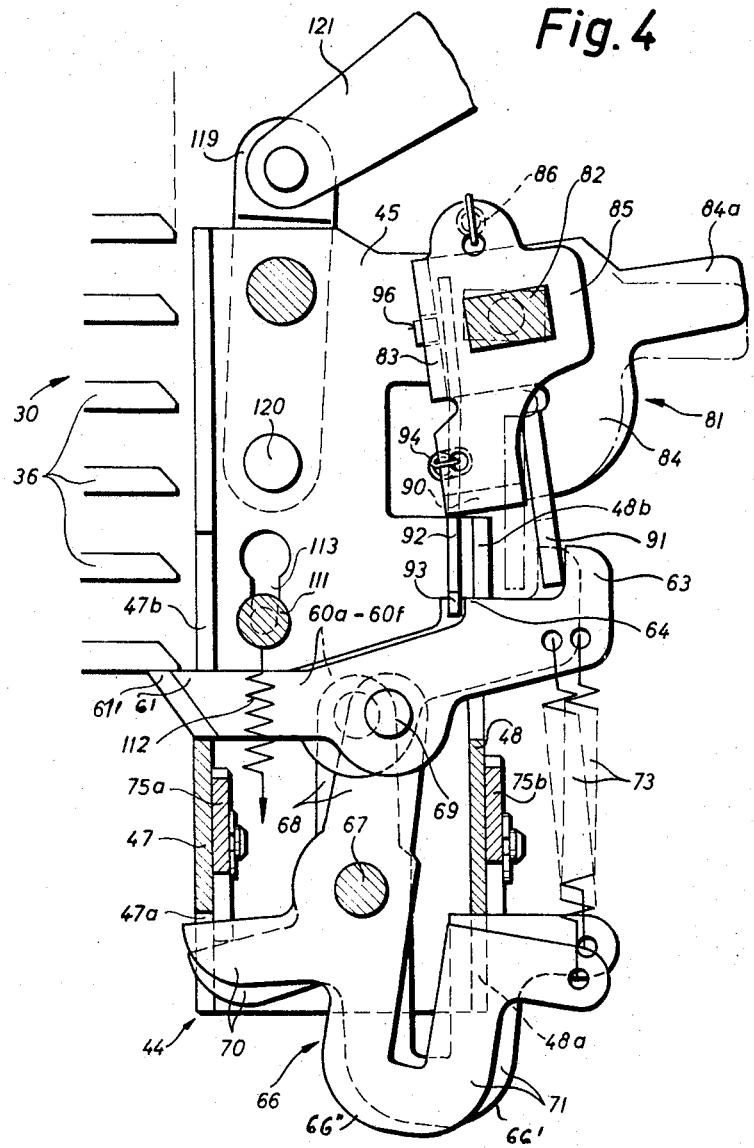
FIG. 4 is a fragmentary horizontal sectional view of the multiplication carriage, and illustrating another operational position.

Six support members 66 are mounted for independent turning movement on a shaft 67 extending between top plate 46 and bottom plate 45. Each support member is substantially a three-armed lever having a stop arm 70, a second arm 71 to which a spring 73 is secured, and a third arm 66 carrying a pivot pin mounting a counter pawl 60, as best seen in FIGS. 3 and 4. The six support members 66a to 66f respectively carry six counter pawls 60a to 60f, as best seen in FIG. 5 which also shows that the counter pawls 60 are located in horizontal planes staggered to the horizontal planes of support members 66. Slots 47a, and slots 47b are provided in front wall 47 for guiding arms 70 of support members 66, and arms 61 of counter pawls 60, respectively, while slots 48a and 48b in rear wall 48 guide arms 71 of support members 66 and arms 63 of counter pawls 60, as shown in FIGS. 3 to 5. The slots extend to the ends of walls 47 and 48, respectively.

Springs 73 connect arms 71 of support members 66 with arms 63 of counter elements 60 so that support members 66 are biased to turn in counterclockwise direction, and counter elements 60 are biased to turn in clockwise direction, as viewed in FIG. 3. An angular displacement of a support member 66 results in a transverse displacement of the pivot pin 69, and in a corresponding transverse displacement of the counter element 60 mounted on the respective support member 66. Since each counter element 60 is shiftable and turnable, arm 61 has three positions 61', 61'' and 61'''. In the position 61', arm 61 will abut an abutment portion 36 located in its path during movement of the multiplication carriage 44 in a direction from the lowest order to the higher order of the multiplier register 30. Consequently, the multiplication carriage 44 will be stopped. In the position 61'', movement of multiplication carriage 44 is not blocked by an abutment portion 36, and in the position 61''', the abutment portion 36 of one order has been passed, and the abutment portion 36 of the next higher order is located in the path of movement of arm 61 and will block the movement of the multiplication carriage 44 in a next following ordinal position cooperating with the second ordinal storing element 31 of multiplier register 30. Arms 61 of counter elements 60 have a slanted end face permitting a rocking movement of counter elements 60 while passing the abutment portions 36 starting from the highest order toward the lowest order during the return movement of the multiplication carriage 44. FIGS. 3 and 4 illustrate only six abutment portions 36 corresponding to the six lowest orders of multiplier register 30 which actually has a greater number of ordinal register elements.

In the position 36 of an abutment portion shown in FIG. 1, four counter elements 60b to 60e will simultaneously abut the abutment portion. If a register element is turned only one step to represent the digit one, only counter element 60e will abut the abutment portion. The circumferential extension of the abutment portion is selected to correspond to five digits, but six counter elements 60 are provided since the shortened multiplication requires an additional operation in the respective next higher order.

Figure 2:
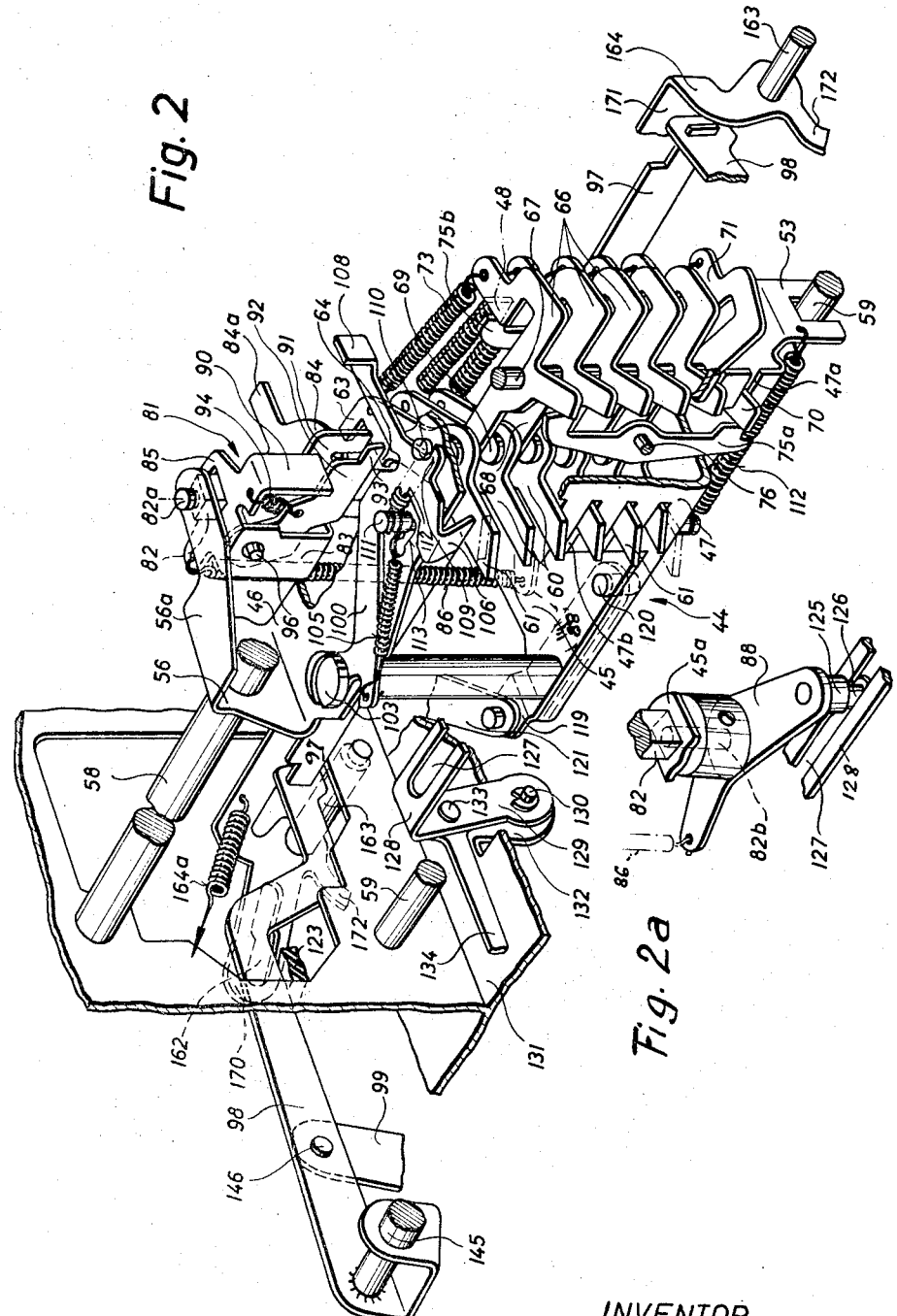
FIG. 2 is a fragmentary perspective view of one embodiment of the invention, and more particularly of a multiplication slide, with parts broken off and shown in section for the sake of clarity.

As schematically shown in FIG. 1, and in greater detail in FIGS. 2 and 5, a substantially T-shaped sensing member 100 is mounted on a pivotal support 103 for angular movement and is urged by a spring 105 to turn in clockwise direction as viewed in FIG. 2 until abutting a stop 110 on cover plate 46. Sensing member 100 has a projecting portion 108 cooperating with the yoke bar 116 of a U-shaped member 114 which is connected by a linkage, not shown, to the result register 23 and moves with the same between the positions in which the negative register element 26 or the positive register elements 25 are effective.

Sensing member 100 has a sensing portion projecting transversely from wall 47 the same distance as arms 61 of counter elements 60 in operative positions.

Sensing portion 106 is positioned at a high level of multiplication carriage 44, so as to be located opposite abutment portions 36 in positions of register elements 31 representing the digits from five to nine. When abutment portions 36 are in these positions, sensing member 100 cannot be angularly displaced in clockwise direction, but when the respective abutment portions represent the digits from zero to four, sensing portion 106 is located above the same and sensing member 100 can be angularly displaced. Consequently, when control member 114 is turned into engagement with projecting portion 108, it will be blocked if a digit between five and nine is stored in the respective order of the multiplier register, since sensing portion 106 abutting the respective abutment portion 36 will prevent a displacement of sensing member 100. Consequently, control member 114 will remain in the position in which the negative register elements 26 of the result register 23 cooperate with gear portions 18 of the transfer members 15, whereas for the lower digits between zero and four, a displacement of sensing member 100 is possible so that the result register can be turned to a position in which the positive register elements 25 are effective to enter the respective values in an additive sense, as is desired for the lowest digits, even if the multiplication is carried out as a shortened multiplication. Control member 114 is biased by spring means, not shown, so that a yielding is possible when sensing member 100 is blocked by an abutment portion.

The bottom plate 45 of multiplication carriage 44 is connected by a pivot 120 and a link 119 to a linkage 121 which connects the multiplication carriage 44 with the pin carriage 7 for movement together between ordinal positions, as required for multiplication operations. The means by which the pin carriage and the multiplication carriage are coupled, are not an object of the present invention.

Figure 7:
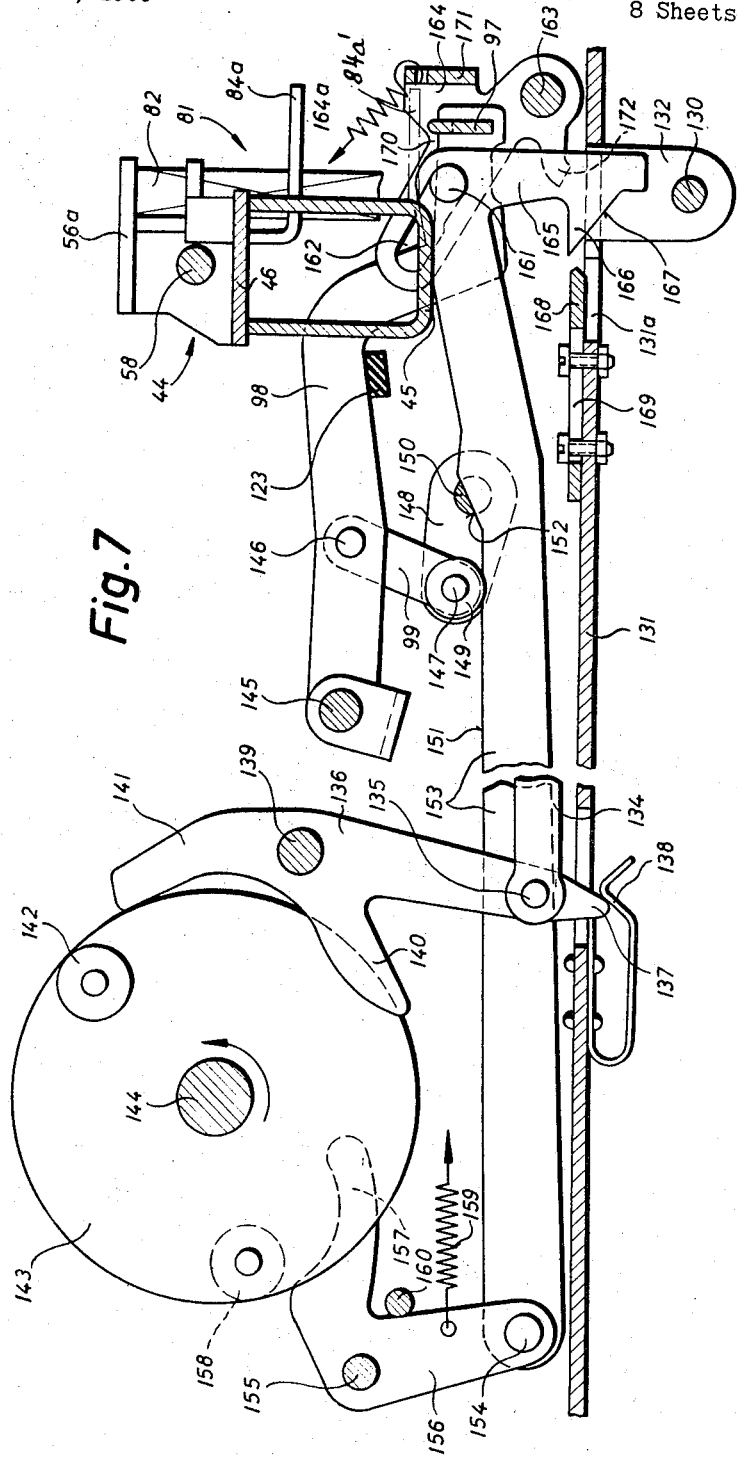
FIG. 7 is a fragmentary vertical sectional view of the apparatus, with certain parts omitted for the sake of clarity.

A counter 81 is mounted on the multiplication carriage, as best seen in FIGS. 2 to 5. A prismatic shaft 82 has an upper stud secured to a lug 56a of portion 56 of cover plate 46, and a lower lug 82b secured to a horizontal lug 45a of bottom plate 45. A substantially U-shaped member 83 has a pair of legs 84 and 85 provided with corresponding rectangular cutouts through which shaft 82 passes so that member 83 can be moved up and down along guide shaft 82. The lower leg 84 has a projecting portion 84a located above a bar 97, as shown in FIGS. 2 and 7 which extends along the entire path of movement of multiplication carriage 44 and is mounted on a pair of arms 98 supported for turning movement on shaft means 145. Lever means 148 are mounted on a shaft 150 and connected by a pin 147 to another lever 99 pivotally connected by a pin 146 to arm 98. A roller 149 is mounted on pin 147 and cooperates with the edge 151 of a member 153 whose function will be explained hereinafter in greater detail. When lever 99 is raised by roller 149 passing over the cam face 152 of member 153, arms 98 are raised together with bar 97 so that projection 84a is engaged by bar 97, and counter 81 is raised to its highest position, which is its normal position. A spring 86 secured to leg portion 85 urges counter 81 toward bar 97, and this spring is tensioned and wound up when the wind-up bar 97 is raised.

As shown in FIGS. 2 to 4, the lower leg portion 84 of U-shaped member 83 has a shifting portion 91 which cooperates with arm portion 63 of a counter element 60 when counter 81 is turned from the position of FIG. 3 to the position of FIG. 4 so that the respective counter element is shifted together with the respective support member 66 and the counter element is withdrawn from the region of an abutment portion 36. The yoke portion of U-shaped member 83 has an opening in which a pivot pin 96 of a releasing member 92 is located so that member 92 is supported for turning movement about a substantially horizontal axis, but sufficient play is provided so that release member 92 can remain in the position shown in FIGS. 3 and 4 when member 83 and shaft 82 are turned from the position of FIG. 3 to the position of FIG. 4. Release member 92 has a sensing end portion 93 abutting a counter element 60 which is in the operative position in which arm 61 is in the position 61'. The upper leg portion 85 of member 83 has an abutment portion 90 against which release member 82 is pulled by a spring 94. The sensing portion 93 of release member 92 abuts the highest counter element in the operative position, so that counter 81 cannot be pulled down by spring 86 until the respective counter element is shifted to the right as viewed in FIGS. 3 and 4 while the respective support member 66 is angularly displaced in clockwise direction.

FIG. 2 illustrates counter 81 in the wound-up position in which sensing portion 93 of release member 92 abuts the highest counter element 60a. In the position of the counter shown in FIG. 5, sensing portion 93 abuts counter element 60e, and the counter has moved a corresponding number of steps down along shaft 82 under the action of spring 86.

Bottom plate 45 and top plate 46 of the multiplication carriage have parallel guide slots 113 in which a stop rod 111 for counter elements 60 is guided. Tension springs 112 act on the ends of stop rod 111 to urge the same against the ends of slots 113, as shown in FIGS. 3 and 4. While the force of springs 112 is sufficient to stop counter elements 60 against the action of springs 73 in positions 61″ and 61‴, stop rod 11 will yield when the multiplication carriage is returned in a direction from the highest orders to the lowest orders of register 30, and the counter elements are angularly displaced in clockwise direction when the slanted end faces of arms 61 successively engage the slanted end faces of abutment portions 36.

As shown in FIGS. 2 to 5, the uppermost support member 66a and the lowermost support member 66f are connected by a pair of double-armed shift levers 75a and 75b which are mounted on pivots 76 on front wall 47 and rear wall 48 of multiplication carriage 44. Each shift lever has end portions 77, 78 cooperating with support members 66a and 66f, respectively, as best seen in FIG. 5. Whenever one of support members 66a and 66b is in the position 66', the respective other support member is in the position 66″ due to the action of shift levers 75a, 75b. As explained above, a counter element 60 mounted on support member 66a or 66f, will be in the position 61″ when the corresponding support member is in the position 66″, and either in the position 61' or 61‴, if the corresponding support member is in the position 66'.

As best seen in FIG. 5, an arresting leaf spring 80 secured to bottom plate 45 cooperates with an arresting projection 79 of at least one of the shift levers to arrest the shift levers in one of two operative positions. Due to the shift levers 75a, 75b, either the uppermost counter element 60a, or the lowermost counter element 60f will be in the operative position in which arm 61 is in the position 61' or 61‴.

As will be explained hereinafter in greater detail, shift lever 75a, 75b obviate the provision of a device similar to a tens-transfer device, which is provided in known apparatus for carrying out shortened multiplications. Furthermore, the shift levers cause the multiplication carriage 44 to skip ordinal positions in which a zero, or successive nines are stored in the register elements 31 of the multiplier register.

As will be explained hereinafter in greater detail, the number of counter elements 60 in operative position is counted by counter 81 moving in downward direction, and during each operation, counter 81 is angularly displaced by shaft 82. After completion of the counting in one decimal order, the counter is wounded up to its highest position in order to be ready for the following counting operations in the next higher decimal order.

The counter is rocked between the position shown in FIG. 3 and the position shown in FIG. 4 by shaft 82, as explained above. Shaft 82 has a lower stud 82b which is extended through lug 45a of the bottom plate 45 and secured to an angular lever 88, as best seen in FIGS. 2a and 5. Spring 86 which is secured to the top plate 85 of U-shaped member 83 is secured to one arm of angular lever 88, and the other arm carries a guide pin 126 guided in the elongated slot 127 of a U-shaped rocking member 128 best seen in the left portion of FIG. 2, in FIG. 2a, and in FIG. 6. The legs 129 of rocking member 128 are mounted on pivots 130 on lugs 132 of a stationary support 131 which also carries the guide rails 58 and 59 of the multiplication carriage 44. As best seen in FIG. 6, one of legs 129 is connected by a pivot pin to a link 134 whose other end is connected by a pivot to a double arm cam follower lever 136 which is turnable about a shaft 139. The lower end of lever 136 has a catch portion 137 cooperating with a leaf spring 138 secured to a horizontal plate of support 131 so that lever 136 is arrested in two angularly displaced positions corresponding to two positions of rocking member 128, and two angularly displaced positions of U-shaped member 83 of counter 81. Lever 136 has two arms 140 and 141 cooperating with a roller 142 mounted on one side of the rotary actuating member 143 which is driven by drive shaft 104 in synchronism with the operational cycle of the machine.

As explained above, the wind-up bar 97 is mounted on arms 98 which are turnable about pivots 145, as shown in FIGS. 2 and 7. In the position of rest, arms 98 abut a stop 123, but bar 97 is raised when roller 149 on link 99 engages a cam face 152 of a cam member 153. One end of cam member 153 is connected by a pivot 154 to an angular lever 156 mounted on a pivot 155 and having an arm 157 cooperating with a roller 158 mounted on the other side of rotary actuating member 143. A spring 159 urges lever 156 to a position abutting a stop 160, but when roller 158 engages arm 157 which has a concave guide face, lever 156 is turned in clockwise direction as viewed in FIG. 7 and cam member 153 is shifted to the left to a position in which cam face 152 cooperates with roller 149 so that wind-up bar 97 is raised.

The other end of cam member 153 carries a guide pin 161 located in an elongated slot 162 of a sensing bar 171, also shown in FIG. 2. Cam member 153 has a downwardly projecting portion 165 having a locking projection 166 with a slanted guide face 167 cooperating with a guide member 168 which is secured by screws to plate 131 and has a slot permitting exact adjustment of the guide edge of guide member 162 in relation to the slanted face 167.

The rockable sensing member 164 with sensing bar 171 senses the lowermost position of counter 81 in which wind-up projection 84a is located in a low position shown in dash and dot lines in FIG. 7 at the level of sensing bar 171. Sensing member 164 has abutment portions 172 which abut plate 131 in a position of member 164 in which the same has been angularly displaced in counterclockwise direction which, however, is only possible if wind-up portion 84a is not in the lowest position shown in dash and dot lines in FIG. 7. In this angularly displaced position of sensing member 164, guide pin 161 is still located above a plane passing through the axis of pivot 154 and of pivot 163.

A spring 164 acts on sensing member 164 and urges the same to turn in counterclockwise direction so that the walls of slot 162 urge guide pin 161 and thereby actuating member 153 to the left as viewed in FIG. 7. However, the spring force of spring 159 is much greater so that sensing member 164 normally assumes the position illustrated in FIG. 7.

*Operation*

The digits of the several orders of the multiplier are entered into the pin carriage 7 by operation of number keys 2 which represent the digits from zero to nine. A multiplier key is actuated, so that a machine cycle is started during which member 22 is lowered to permit the sensing of the value stored in the pin carriage by transfer members 15 which assume corresponding angularly displaced digital positions. At the same time, the multiplier register 30 is cleared in the usual manner.

During the second half of the operational cycle, the ordinal gear elements 31 of multiplier register 30 are placed in meshing engagement with the correlated ordinal transfer members 15 so that the multipler value is transferred into the multiplier register by storing in each ordinal register element 31 a digit of the multiplier. The locking means 40 is operated to lock the register gear elements in the respective digital positions so that the multiplier remains stored in multiplier register 30 until another multiplier is entered.

Abutment portions 36 of the register gear elements 31 are in different positions, corresponding to the digital position of the respective ordinal register gear element 31. The position shown in solid lines in FIG. 1 corresponds to a digital position representing the digit four, and it will be noted that four counter elements 60b to 60e project into the region of the abutment portion. Position 37 corresponds to a digital position representing the digit zero, and none of the counter elements project into the region of an abutment portion in position 37. Position 38 of the abutment portion is assumed when the corresponding register gear element 31 is in a digital position representing the digit nine, and only the highest counter element 60a projects into the region of an abutment portion in the position 38.

As is apparent from FIG. 1, a register gear element 31 in a digital position representing the digit five will be located higher and also cooperate with counter element 60a. An abutment portion 36 representing the digit three will cooperate only with the three counter elements 60c, 60d, 60e.

On the other hand, abutment portions in digital positions corresponding to the digits five to nine will cooperate with sensing portion 106, and also with a number of counter elements 60, which is the complement of the digit stored in the respective ordinary register element 31 of register 30. For example, when the digit seven is stored, only the three highest counter elements 60a, 60b, 60c, when the digit eight is stored only the two highest counter elements 60a, 60b, and when the digit nine is stored only the highest counter element 60a will cooperate with the abutment portion in the respective position.

Consequently, the number of abutting counter elements represents the digits from zero to four, or the complements of the digits from five to nine. When the digit zero is stored in the register 30, only the counter element 60f can cooperate with the abutment portion in position 37.

As explained above, the multiplication carriage 44 on which support members 66 and counter elements 60 are mounted moves toward the left as viewed in FIG. 2, and in the direction of the arrow in FIG. 3 parallel to the axis of register 30. At first, carriage 44 is in an inoperative position in which the counter elements 60 are located one step spaced from the abutment portion of the lowest register gear element 31, permitting a turning of the register gear elements to positions representing the multiplier. Thereupon means 121 are operated to shift the multiplication carriage 44 one step to the position illustrated in FIG. 3 and to couple the multiplication carriage 44 with pin carriage 7 for movement together between ordinal positions under the action of a spring, not shown, secured to portion 14 of pin carriage 7. The particular construction by which the coupling and disengagement of the carriages is obtained, is not an object of the present invention, but it will be understood that the movement of multiplication carriage 44 under the action of a spring permits the blocking of multiplication carriage 44 when a counter element abuts an abutment portion in the position 61', while the movement of the multiplication carriage will be continued to the next following ordinal position when all counter elements are in the position 61" or in the position 61''' or above or below the respective abutment portion.

In FIGS. 3 and 4, the mutiplication carriage is stopped in an ordinal position corresponding to the lowest order. When the multiplication carriage has passed all abutment portions of the ordinal register gear elements 31, it is wound up and returned to its initial inoperative position, and during such movement, the slanted end faces of the counter elements are engaged by the slanted faces of the abutment portion 36, and counter elements 60 are pivoted in clockwise direction as viewed in FIG. 3 and do not block movement of the multiplication carriage 44 in a direction opposite to the direction of the arrow in FIG. 3 and from the highest order toward the lowest order.

During movement in the direction of the arrow between ordinal positions, counter elements 60, and more particularly arms 61 move along parallel straight paths. The abutment portions 36 cross the six paths of the counter elements when in the digital positions between one and nine, but as explained above, according to the digital position of the respective register gear element 31, abutment portions 36 are located across different numbers of counter elements 60. Even if the abutment portion of a register gear element 31 is located in the path of only one counter element, multiplication carriage 44 will stop in the corresponding ordinal position.

As shown in FIG. 1, counter element 60f could cooperate with the abutment portion in the position 37, but is shifted to the right to an inoperative position which is shown a 61" in FIG. 3. This is due to the effect of shifting levers 75a, 75b by which support member 66a was shifted to a position in which counter element 60a is in the position 61''', as shown in FIG. 3. Consequently, if the digit nine is stored in a register gear element 31 counter elements 60a will cooperate with the abutment portion in position 38.

The multiplicand and the multiplier may be printed during the second half of an operational cycle during whose first half the multiplier was entered into the multiplier register 30.

FIG. 3 shows the uppermost support member 66 in a first position in which pivot pin 69 is shifted to the left, the corresponding counter element 60 was shifted from the position 61''' to the position 61' when carriage 44 moved to a position in which the abutment portion engaged arm 61 in position 60'''. Arm 71 abuts the wall of slot 48a, and arm 61 abuts the end of slot 47b so that movement of carriage 44 is blocked. Spring 73 holds the uppermost support member 66 in the position 66'.

Another support member 66 has been moved to the position 66", so that the corresponding counter element is shifted to the right and its arm 61 is in the position 61" in which it will pass the abutment portions 36. The pressure of the multiplication carriage 44 has turned the uppermost counter element 60 to the abutting position 61'. In this position, the portion 64 of counter element 66 is located under sensing portion 93 of a blocking and release member 92 so that counter 81 is blocked and cannot move downward under the action of spring 86.

During the following calculating operations by which a multiplication is carried out by adding the multiplicand as many times as required by a digit in an order of the multiplier, or by subtracting the multiplicand as many times as determined by a complement of a digit of a multiplier.

Transfer members 15 are released by member 22 and move toward pins 10 of the pin carriage. At the same time, the drive means of the machine cause operation of actuating means which wind up counter 81 by moving the same to the highest position in which blocking and release member 92 is located above the highest counter element 60a. Directly after the counter 81 is in the highest position, it is released and downwardly pulled by spring 86 so that sensing portion 93 of blocking and release member 92 abuts on portion 64 of the highest counter element, if the same is displaced to an operative position so that the counter stops.

Figure 9:
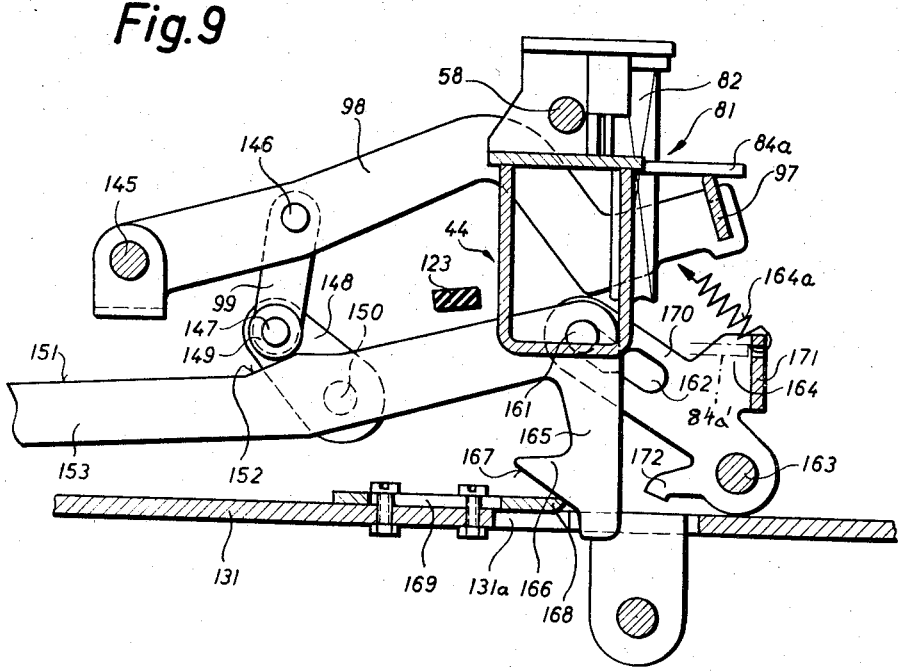
FIG. 9 is a fragmentary vertical sectional view corresponding to FIG. 8, but illustrating another operational position.

The raising of counter 81 to its highest position, and the winding-up of spring 86, can take place only when counter 81 has moved to its lowest position indicated in FIGS. 7 and 9 by the wind-up projection 84a in the position 84a' shown in broken lines. In this position, wind-up projection is located in the circular path of movement of sensing bar 171 of member 164.

Figure 8:
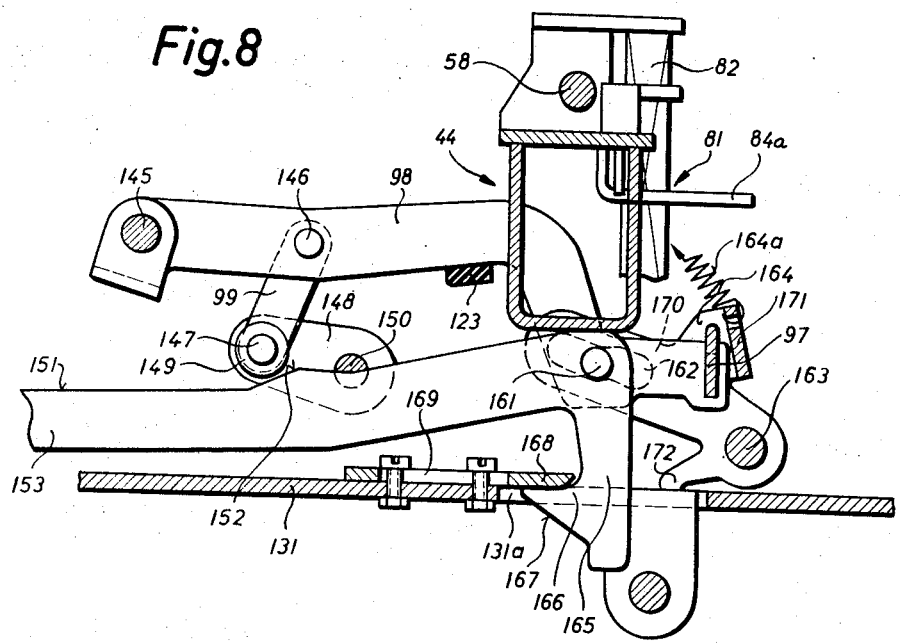
FIG. 8 is a fragmentary vertical sectional view corresponding to a portion of FIG. 7, but illustrating another operational position.

The rotary actuating member 143 is shown in FIG. 7 in an initial position of rest. During the operational cycle of the machine, shaft 144 is rotated in the direction of the arrow, and during the first half of the operational cycle, roller 158 turns, against the action of spring 159, lever 156 by engaging its arm 157 so that actuating member 153 is pulled to the left as viewed in FIG. 7. Guide pin 161 moves in the same direction, and turns member 164 in counterclockwise direction about pivot means 163 until wind-up projection 84a in the lowest position 84a' stops further turning movement of member 164 substantially in the position of FIG. 7. When member 164 is blocked, guide pin 161 slides along slot 162 so that cam face 152 engages roller 149 and raises link 99 and arm 98 together with the wind-up bar 97 which engages wind-up portion 84 in the position 84a' and raises the same together with the entire counter 81 to the highest position of the counter, as shown in FIG. 9. As soon as the wind-up projection has moved out of position 84a', member 164 is released, and turned by spring 164a in clockwise direction until projections 172 abut support plate 131. Actuating member 153 is turned by pin 161 so that projection 165 moves downward and the slanted face 167 slides on locking member 168 so that finally the position of FIG. 8 is obtained in which the locking projection 167 is located under locking member 168. At the same time, roller 149, arm 98, and wind-up bar 97 are lowered.

During the upward winding-up movement of counter 81, the slanted upper edge of portion 93 of blocking and release member 92 permit a yielding of blocking and release member 92 when passing and engaging counter elements 60 in operative positions. When wind-up bar 97 releases wind-up projection 84a during downward movement, sensing portion 93 of blocking and release member 92 abuts portion 64 of the uppermost counter element 60 in the abutting position shown at 61' in FIG. 3. When roller 158 releases arm 157 during further turning movement of rotary actuating member 143, all movable parts of the wind-up means are returned by spring 159 to the initial position of rest shown in FIG. 7.

Due to the arrangement of wind-up portion 84a and sensing bar 171, the counter can only be wound up after it has moved down to its lowest position whereby the successive sensing of all counter elements in operative abutting positions is assured. When the multiplication carriage 44 is in an inoperative position in which the counter elements are spaced from the abutment portion of the lowest order of multiplier register 30, repeated operation of the wind-up means is prevented by a cutout in sensing bar 171 in the region of the wind-up portion in the position 84a'. As long as portion 64 of a counter element 60 is engaged by member 92, 93, wind-up projection 84a is located above sensing bar 171. If during an operational cycle, roller 158 engages arm 157 of lever 156, actuating member 153 is shifted to the left, as explained before, but in this event member 164 rocks without being blocked by portion 84a' until projections 172 abut support plate 131, and consequently slot 162 cannot guide pin 161 and therefore the wind-up bar 97 to a higher position. The locking projection 166 is moved down during the rocking movement of member 164 and assumes the locking position shown in FIG. 8 which prevents a winding-up of counter 81. When after sensing of all counter elements 60 by a blocking and release member 92, 93, projection 84a arrives in the position 84a', member 164 is again locked, and counter 81 is wound-up again.

It will be seen that the counter wound-up in each ordinal position of the carriage 44 and is permitted to move down under the action of spring 86 to count the number of counter elements 60 in operative abutting positions 61'.

During the second half of an operational cycle, roller 142 engages arm 140 of lever 136, see FIG. 6, and turns the same in counterclockwise direction, shifting member 134 to the right whereupon lever 136 is arrested by spring 138. Rocking member 128 is angularly displaced so that lever 88 is turned and angularly displaces the prismatic shaft 82 of counter 81 so that the counter turns from the position of FIG. 3 to the position of FIG. 4 together with shifting member 91. During the further turning of rotary actuating member 143, roller 142 engages arm 141 and returns members 136, 134, 128 and counter 81 to the initial positions. Arresting projection 137 of lever 136 is again arrested by spring 138 in the position of FIG. 6.

At the beginning of the operation, release member 92 was in a position in which release member 92, 93 abutted the highest counter element 60 in the position 61'. When the counter is turned to the position of FIG. 4, the respective counter element 60 is shifted to the right, first to the intermediate position 60' shown in FIG. 4 in which portion 64 moves away from release member 92, 93 so that counter 81 is released for movement under the action of spring 86 in downward direction until sensing portion 93 of release member 92 is engaged by portion 64 of the next lower counter element 60 in the operative position 61'.

Shifting member 91 continues its angular movement with counter 81 so that the uppermost counter element is shifted from the position 60' shown in FIG. 4 farther to the right until arm 61 releases abutment projection 36 permitting spring 73 to turn the counter element in clockwise direction to the position 61" shown in FIG. 3 and at the same time, the respective support member 66 is turned by spring 73 to the position 66' so that the counter element moves to the position 61'" located behind the abutment portion 36, and abutting stop means 111. The loosely mounted release member 92 cannot follow the shifted counter element, since it laterally abuts portion 48b of wall 48, as best seen in FIG. 4. The uppermost counter element in the position 61'" is now ready to cooperate with the abutment portion 36 of the register gear element 31 of the next higher order when multiplication carriage 44 continues its movement. However, if lower counter elements 60 abut the first abutment portion, the operations are repeated, and counter 81 is angularly displaced as many times as there are counter elements in operative positions abutting the abutment portion 36 of the lowest order of register 30. For example, if the first abutment portion 36 represented digit four, counter 81 will perform four rocking movements in positions in which release member 92 successively abuts the four counter elements 60b to 60e which abut portion 36 as shown in FIG. 1. The sensing member 100 in the normal position abutting stop 110, holds member 116, see FIGS. 1 and 2, in a position in which the negative register gears 26 of result register 23 cooperate with the transfer members. Projection 106 of sensing member 100 is blocked by abutment portions 36 representing the digits from five to nine so that sensing member 100 cannot be turned by member 114 to shift result register 23 to a position in which the additive register elements 25 are effective when the digits from five to nine are stored in register elements 31, in other words when the number of counter elements 60 in operative abutting positions corresponds to the complement of one of the digits from five to nine.

On the other hand, if the abutment portion 36 is in a position representing the digits from zero to four, the upper edge of the abutment portion is below the lower edge of sensing projection 106 so that sensing member 100 can freely turn to a position in which member 114 is turned a corresponding angle to a position causing engagement of the positive register gears 25 with transfer members 15 so that for the digits zero to four of the multiplier, the multiplicand is added a corresponding number of times in result register 23.

During the second half of the operational cycle of the machine, the multiplicand is added, or subtracted in result register 23 under the control of sensing means 100, 106. At the end of the second half of the operational cycle, counter shaft 82 is angularly displaced to cause the second and following additive or substractive operations.

When the uppermost counter element 60a abuts an abutment portion 36, which is only the case when one of the digits from five to nine is stored in the respective order of register 30, and is shifted by the counter 81 and shifting member 91, shifting levers 75a, 75b cause a corresponding displacement of the lowest support member 66f so that the same is placed in an operative position in the region of abutment portion 36, while counter element 60a remains transversely spaced from the abutment portion. All abutting counter elements 60 are successively sensed by counter 81, and when the lowest counter element 60 is shifted to the inoperative position, multiplication carriage 44 is released, and moved, together with pin carriage 7, to its next ordinal position. If in the second order, a digit between zero and four is stored, the lowest counter element 60f will run against the abutment portion 36, requiring an additional step of counter 81 in downward direction while sensing the counter elements abutting the abutment portion 36 of the second order, and a corresponding number of angular displacements of counter 81. Since counter element 60f is counted in addition to the counter elements representing the digit stored in the respective second order, an additional additive operation is carried out by register 23, while the shifting levers 75a, 75b shift the uppermost counter element 60a When the lowest counter element 60f is shifted by the counter, the uppermost counter element 60a remains in the operative position 61‴.

If abutment portion 36 of the second following order stores one of the digits five to nine, one subtractive operation less is carried out, since the uppermost counter element 60a is shifted out of the region of abutment portion 36. Consequently, a multiplier such as 999,999,999 requires only two operations, since all nines following the first order are skipped since only the uppermost counter element 60a could abut an abutment portion 36. The first operation involves the shifting of the uppermost counter element 60a to an inoperative position, and the shifting of the lowermost counter element 60f to an operative position by shifting levers 75a, 75b. All following abutment portions of register elements in the digital positions nine are skipped since counter element 60a, which is the only one which could cooperate with abutment portions of register elements in the digit position nine is shifted to the inoperative position in which they cannot engage abutment portion 36.

Only when the multiplication carriage 44 arrives in an ordinal position corresponding to the next higher order after the highest order in which a nine is stored, in which the next higher order a zero is assumed to be stored, the lowermost counter element 60f runs against abutment portion 36 and stops the multiplication slide. The machine, controlled by sensing member 100, carries out an additive operation in result register 23 while the lowermost counter element 60f is shifted by counter 81 so that by operation of shifting lever 75a and 75b and the respective uppermost and lowermost support member 66, the uppermost counter element 60a is again shifted to the operative position. Consequently, the shifting levers 75a, 75b eliminate the necessity for a tens-transfer-like device provided in apparatus according to the prior art.

Those orders of multiplier register 30 in which a zero is stored are skipped since in the zero position 37 of abutment portion 36, no counter element cooperates with the abutment portion, counter elemenet 60f being retracted to the inoperative position 61″, and only shifted to the operative position when counter element 60a is shifted, as explained above. During the first half of the following operation, counter 81 is again wound up to its uppermost position, which requires movement of the counter to its lowermost position, assuring that all counter elements were sensed and counted by the counter. After all orders of the multiplier register have transferred the digits stored therein, partly in the form of complements, to the counter elements and to the counter, multiplication carriage 44 moves without stopping past the abutment portions 36 of the highest orders, which are all in zero position. During the following totalizing and printing operations, the pin carriage is wound-up again, together with the multiplication carriage 44 coupled thereto. Counter elements 60 resiliently yield when passing the abutment portions 36 which are still in operative positions representing the digits of the multiplier which remains in the multiplier register 30 after the multiplication has been completed, and the result of the multiplication stored in result register 23.

If another multiplication using the same multiplier is desired, a new multiplicand is entered into pin carriage 7 by operation of number keys 2, whereupon the multiplication key is again actuated, and the above described operations are started again so that the new multiplicand is repeatedly added, or complement values repeatedly subtracted under the control of counter 81. Any number of multiplications, with a constant factor which is used as multiplier, are possible since the register gear elements 31 of the multiplier rigister remain in the digital positions irrespective how often the multiplier stored therein is used for carrying out additive and subtractive operations required for a shortened multiplication.

In the above described preferred embodiment of the invention, six counter elements are provided of which the lowermost is normally not operative. Each abutment portion 36 has a width or circumferential extension equal to the distance between the paths of movement of the highest and lowest counter elements of five adjacent counter elements. The number five is a selected number, and it is possible to perform five additive operations when the digit five is stored in the ordinal register elements 31. When digits from one to four are stored in the orders of the register, the same number of counter elements 60, located above the lowermost counter elements 60f, run against the respective abutment portion, and the same number of additive operations are carried out in result register 23. When the digit five is stored, the five uppermost counter elements 60a to 60e about the abutment portion 36, and five subtractive operations are carried out.

For stored digits between six and nine the uppermost four to one counter elements 60 abut abutment portion 36, representing complement values requiring subtractive operations.

When the digits between five and nine are stored in the multiplier register, which requires subtractive operations of the result register, the uppermost counter element 60a remains outside of the region of abutment portion 36, and causes by shifting levers 75a, 75b movement of the lowermost counter element 60f into the region of abutment portion 36. Thereby, an additional additive operation is carried out for digits between zero and four, whereas for digits between five and nine, one subtractive operation less is carried out. After the lowermost counter element 60f has been evaluated and shifted to an inoperative position, the uppermost counted element 60a is shifted to the operative position projecting into the region of the abutment portion.

It will be understood that each of the elements described above, or two or more together, may also find a useful application in other types of calculators differing from the types described above.

While the invention has been illustrated and described as embodied in an apparatus for carrying out a shortened multiplication with a multiplier stored in a register, and remaining stored in the register after the shortened multiplication, it is not intended to be limited to the details shown, since various modifications and structural changes may be made without departing in any way from the spirit of the present invention.

Without further analysis, the foregoing will so fully reveal the gist of the present invention that others can by applying current knowlegde readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calcuator, in combination apparatus for carrying out shortened multiplications, comprising a set of spaced counter elements movable along parallel paths between a plurality of ordinal positions; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements so that counter elements in whose paths an abutment portion is located abut the same in said ordinal positions, the number of abutting counter elements representing real digits lower than said selected number or complements of other digits which are equal to or higher than said selected number; a result register; sensing means for sensing the digital positions of said register elements and controlling said result register to perform additive operations or subtractive operations, respectively, when sensing digital positions corresponding to said lower digits and said other digits, respectively; and counter means for counting in each ordinal position of said counter elements the number of abutting counter elements for causing a corresponding number of additive or subtractive operations of said result register.

2. An apparatus as set forth in claim 1 wherein said register elements have circular peripheral gear portions, and other peripheral portions which are said abutment portions.

3. An apparatus as set forth in claim 2 wherein said abutment portions are projecting, substantially sector-shaped portions of said register elements.

4. An apparatus as set forth in claim 1 including spring means for urging said counter elements to a preliminary position, said counter elements being turned to a blocking position when abutting said abutment portions during movement of said counter elements; stop means for stopping said counter elements in said blocking positions so that said counter elements are stopped in said ordinal positions during movement in one direction to ordinal positions associated with ascending orders, while said counter elements resiliently yield when engaging said abutment portions during movement of said counter elements in the opposite direction corresponding to a descending sequence of orders.

5. In a calculator, in combination apparatus for carrying out shortened multiplications, comprising a multiplication carriage movable in one direction; a set of spaced counter elements mounted on said multiplication carriage for movement with the same in said direction along parallel paths between a plurality of ordinal positions; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements so that counter elements in whose paths an abutment portion is located abut the same in said ordinal positions, the number of abutting counter elements representing real digits lower than said selected number or complements of other digits which are equal to or higher than said selected number; a result register; sensing means for sensing the digital positions of said register elements and controlling said result register to perform additive operations or subtractive operations, respectively, when sensing digital positions corresponding to said lower digits and said others digits, respectively; and counter means for counting in each ordinal position of said counter elements the number of abutting counter elements for causing a corresponding number of additive or subtractive operations of said result register.

6. In a calculator, in combination apparatus for carrying out shortened multiplications, comprising a set of spaced counter elements movable along parallel paths between a plurality of ordinal positions; a multiplier register including an ordinal series of register elements having abutment portions of a width equal to the distance between the paths of the first and last counter elements of five counter elements, five being the maximum number of additive or subtractive operations to be carried out during a shortened multiplication, said register elements being movable between digital positions in which said abutment portions are located in said paths of said counter elements so that counter elements in whose paths an abutment portion is located abut the same in said ordinal positions, the number of abutting counter elements representing real digits from zero to four, or complements of the other digits between five and nine; a result register; sensing means for sensing the digital positions of said register elements and controlling said result register to perform additive operations or subtractive operations, respectively, when sensing digital positions corresponding to the digits from one to four, and the digits from five to nine, respectively; and counter means for counting in each ordinal position of said counter elements the number of abutting counter elements for causing a corresponding number of additive or subtractive operations of said result register.

7. An apparatus as set forth in claim 6 wherein six counter elements are provided and wherein said width of said abutment portions correspond to five digital positions of said register elements so that said abutment portions are located in the paths of no more than five counter elements so that in a digital position of a register element corresponding to zero the last counter element only cooperates with said abutment portion, in a digital position corresponding to nine, only the first counter element cooperates with the abutment portion, and in a digital position corresponding to the digit five, the first five counter elements cooperate with said abutment portion.

8. In a calculator, in combination apparatus for carrying out shortened multiplications, comprising a set of spaced counter elements movable along parallel paths between a plurality of ordinal positions; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements so that counter elements in whose paths an abutment portion is located abut the same in said ordinal positions, the number of abutting counter elements representing real digits lower than said selected number or complements of other digits which are equal to or higher than said selected number; a result register; sensing means for sensing the positions of said abutment portions and thereby the digital positions of said register elements and controlling said result register to perform additive operations or subtractive operations, respectively, when sensing digital positions corresponding to said lower digits and said other digits, respectively; and counter means for counting in each ordinal position of said counter elements the number of abutting counter elements for causing a corresponding number of additive or subtractive operations of said result register.

9. In a calculator, in combination apparatus for carrying out shortened multiplications, comprising a multiplication carriage movable in one direction; a set of spaced counter elements mounted on said multiplication carriage for movement with the same in said direction along parallel paths between a plurality of ordinal positions; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements so that counter elements in whose paths an abutment portion is located abut the same in said ordinal positions, the number of abutting counter elements representing real digits lower than said selected number or complements of other digits which are equal to or higher than said selected number; a result register; sensing means including a sensing member mounted on said carriage and having a sensing portion movable along one of said paths for sensing the abutment portions and thereby the digital positions of said register elements, said sensing means controlling said result register to perform additive operations or subtractive operations, respectively, when sensing digital positions corresponding to said lower digits and said other digits, respectively; and counter means for counting in each ordinal position of said counter elements the number of abutting counter elements for causing a corresponding number of additive or subtractive operations of said result register.

10. An apparatus as set forth in claim 9 wherein said sensing member is a lever having one arm mounted for turning movement on said carriage, another arm having said sensing portion, and a third arm; a stop mounted on said carriage cooperating with said sensing member; a spring connected to said sensing member for turning the same to a normal position abutting said stop; and means controlling said result register to perform additive operations or subtractive operations, and having two corresponding positions, said means moving from one of said positons to the other of said positions thereof engaging said sensing member for turning the same, said sensing member being blocked against turning movement when said sensing portion thereof senses an abutment portion in a position corresponding to a digital position of said register elements associated with said other digits so that said result register means in a position for subtractive operations, said sensing member being freely turnable when the respective register element is in a digital position representing said lower digits so that said last mentioned means can be moved to the other position causing said result register to perform additive operations.

11. In a calculator, in combination apparatus for carrying out shortened multiplications, comprising a multiplication carriage movable in one direction; a set of spaced counter elements mounted on said multiplication carriage for movement with the same in said direction along parallel paths between a plurality of ordinal positions; a multiplier register including an ordinal series of register elements having abutment portions of a width equal to the distance between the paths of the first and last counter elements of a selected number of counter elements, said selected number being the maximum number of additive or subtractive operations to be carried out during a shortened mutliplication, said register elements being movable between digital positions in which said abutment portions are located in said paths of said counter elements so that counter elements in whose paths an abutment portion is located abut the same in said ordinal positions, the number of abutting counter elements representing real digits lower than said selected number or complements of other digits which are equal to or higher than said selected number; a result register; sensing means for sensing the digital positions of said register elements and controlling said result register to perform additive operations or subtractive operations, respectively, when sensing digital positions corresponding to said lower digits and said other digits, respectively; counter means for counting in each ordinal position of said counter elements the number of abutting counter elements for causing a corresponding number of additive or subtractive operations of said result register, said counter means being mounted on said carriage biassed for movement in a direction transverse to said paths, and for turning movement to a displaced position, and including a sensing member for sensing abutting counter elements for stopping said counter means, said counter means shifting said counter elements to an inoperative position spaced from said sensing member and permitting movement of said counter means to the respective next following counter element when turned to said displaced position.

12. In a calculator, in combination, apparatus for carrying out shortened multiplications, comprising a carriage movable in one direction between ordinal positions, a set of support members mounted on said carriage for independent turning movement about an axis between first and second positions and for movement with said carriage in said direction, a set of counter elements respectively mounted on said support members for movement with the same between a first operative position and a second inoperative position for turning movement relative to said support members in said operative position between a preliminary position and a blocking position, and for movement with said carriage along parallel paths; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements which are supported by support members in said first position and are in said operative position so that counter elements in whose paths an abutment portion is located are turned from said preliminary position to said blocking position and abut the same to block movement of said carriage in said ordinal positions, the number of abutting counter elements representing real digits lower than said selected number or complements of other digits which are equal to or higher than said selected number; a result register; sensing means for sensing the digital positions of said register elements and controlling said result register to perform additive operations or subtractive operations, respectively, when sensing digital positions corresponding to said lower digits and said other digits, respectively; and counter means for counting in each ordinal position of said counter elements the number of abutting counter elements for causing a corresponding number of additive or subtractive operations of said result register.

13. An apparatus as set forth in claim 12 wherein the number of said counter elements is one more than said selected number so that said abutment portions in any one of said digital positions are not located in the paths of all counter elements.

14. An apparatus as set forth in claim 12 wherein said counter elements are double-armed levers; wherein said support members are levers; and including a shaft mounted on said carriage and supporting said support members for independent turning movement.

15. An appartus as set forth in claim 14 wherein said carriage has walls formed with two sets of slots in which said counter elements and said support members, respectively, are guided, the ends of said slots forming stop surfaces for said counter elements and support members.

16. An apparatus as set forth in claim 12 wherein the number of said counter elements, and of said support members is greater by one than said selected number; and including shifting lever means mounted on said carriage and operatively connecting the first and the last support members so that the first support member is in its first position when said last support member is in said second position, and vice versa, so that either the first or the last counter element is in said operative position.

17. An apparatus as set forth in claim 16 and including resilient arresting means mounted on said carriage for arresting said shifting lever means in two positions corresponding to said first and second positions of said first and last support members.

18. An apparatus as set forth in claim 12 wherein each of said counter elements is a double-armed lever, wherein each of said support members is a lever having one arm having a pivot means for supporting the respective counter element, and another arm; and including a spring connecting said other arm of said support member with one arm of said counter element for urging said support member to said first position, and said counter element to said preliminary position, said other arm abutting said carriage in said first position, each support member having a third arm abutting said carriage in said second position.

19. In a calculator, in combination, apparatus for carrying out shortened multiplications, comprising a carriage movable in one direction between ordinal positions, a set of support members mounted on said carriage for independent turning movement about an axis between first and second positions and for movement with said carriage in said direction; a set of counter elements respectively mounted on said support members for movement with the same between a first operative position and a second inoperative position, for turning movement relative to said support members in said operative position between a preliminary position and a blocking position, and for movement with said carriage along parallel paths; springs connecting correlated counter elements and support members urging the same to said preliminary and said first position, respectively; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements which are supported by support members in said first position and are in said operative position so that counter elements in whose paths an abutment portion is located are turned from said preliminary position to said blocking position and abut the same to block movement of said carriage in said ordinal positions, the number of abutting counter elements representing real digits lower than said selected number or complements of other digits which are equal to or higher than said selected number; a result register; sensing means for sensing the digital positions of said register elements and controlling said result register to perform additive operations or subtractive operations, respectively, when sensing digital positions corresponding to said lower digits and said other digits, respectively; and counter means for counting in each ordinal position of said counter elements the number of abutting counter elements for causing a corresponding number of additive or subtractive operations of said result register.

20. In a calculator, in combination, apparatus for carrying out shortened multiplactions, comprising a carriage movable in one direction between ordinal positions, a set of support members mounted on said carriage for independent turning movement about an axis between first and second positions and for movement with said carriage in said direction; a set of counter elements respectively mounted on said support members for movement with the same between a first operative position and a second inoperative position for turning movement relative to said support members in said operative position between a preliminary position and a blocking position, and for movement with said carriage along parallel paths; springs connecting correlated counter elements and support members urging the same to said preliminary and said first position, respectively; a multiplier register including an ordinal series of register elements having abutment portions of a width equal to the distance between the paths of the first and last counter elements of a selected number of counter elements, said selected number being the maximum number of additive or subtractive operations to be carried out during a shortened multiplication, said register elements being movable between digital positions in which said abutment portions are located in said paths of said counter elements which are supported by support members in said first position and are in said operative position so that counter elements in whose paths an abutment portion is located are turned from said preliminary position to said blocking position and abut the same to block movement of said carriage in said ordinal positions, the number of abutting counter elements representing real digits lower than said selected member of complements of other digits which are equal to or higher than said selected number; a result register; sensing means including a sensing member mounted on said carriage and having a sensing portion movable along one of said paths for sensing the abutment portions and thereby the digital positions of said register elements, said sensing means controlling said result register to perform additive operations or subtractive operations, respectively, when sensing digital positions corresponding to said lower digits and said other digits, respectively; counter means for counting in each ordinal position of said counter elements the number of abutting counter elements for causing a corresponding number of additive or subtractive operations of said result register; means mounting said counter means on said carriage for translatory movement transverse to said direction, and for angular movement between a normal position and a displaced position; biasing means urging said counter means to perform said translatory movement; wind-up means for cyclically moving said counter means to an initial position against the action of said biassing means; actuating means for cyclically turning said counter means between said normal and displaced positions; and a blocking member mounted on said counter means for sensing and abutting counter elements in said blocking position whose support members are in said first position, and for blocking said translatory movement of said counter means when abutting a counter element in said blocking position, said counter means when turned to said displaced position shifting the respective sensed counter element to said inoperative position and the respective support member to said second position so that said blocking member and counter means are released for said translatory movement under the action of said biassing means to a position in which said blocking member abuts the next following counter element.

21. An apparatus as set forth in claim 20 wherein said mounting means include a prismatic shaft supporting said counter means for translatory movement along the same in said direction; and wherein said actuating means are connected to said prismatic shaft for turning the same with said counter means between said normal and displaced positions.

22. An apparatus as set forth in claim 21 and including means for mounting said blocking member for turning movement in a direction opposite to the direction of said translatory movement of said counter means under the action of said biassing means, and for mounting said blocking member for limited angular displacement in the direction of angular movement of said counter means.

23. An apparatus as set forth in claim 22, and including a lever arm secured to said prismatic shaft and having a guide pin; and wherein said actuating means include a rocking member having an elongated slot extending in the direction of movement of said carriage and receiving said guide pin, arresting means for arresting said rocking member in two positions corresponding to said normal and displaced positions of said counter means; and drive means for shifting said rocking member between said positions.

24. An apparatus as set forth in claim 21 wherein said drive means include a rotary actuating member having a projecting portion, and a lever shifted by said projecting portions between two positions, and connected to said rocking member for rocking the same, said arresting means cooperating with said lever.

25. An apparatus as set forth in claim 24 wherein said lever has two arms, and wherein said projection is a roller successively engaging said two arms of said lever for shifting the same between two positions corresponding to said normal and displaced positions of said counter means during each revolution of the rotary actuating member.

26. An apparatus as set forth in claim 25 wherein said rotary actuating member performs one revolution during each operational cycle of the calculator, and wherein said roller is disposed to effect turning of said counter means to said displaced position during the second part of the operational cycle of the machine.

27. An apparatus as set forth in claim 20 wherein each counter element has a portion on which said blocking member abuts when the respective counter element is in said blocking position; and wherein said counter means includes a shifting member cooperating with the respective counter element for shifting the same to said inoperative position, and the respective support member to said second position when said counter means turns to said displaced position, said counter elements in said inoperative position having said portion thereof spaced from said blocking member so that the same releases said counter means in said inoperative position of the respective counter element for translatory movement to a position in which said blocking member abuts the next following counter element in said blocking position.

28. An apparatus as set forth in claim 27 and including a stationary abutment on said carriage cooperating with said blocking member for preventing displacement of the same together with said counter means turning to said displaced position, and said counter elements being moved to said inoperative position.

29. An apparatus as set forth in claim 27 wherein said blocking member is mounted for turning movement in the direction of said translatory movement, including a spring connected to said blocking member for turning the same away from said counter elements, and a stop on said counter means limiting turning movement of said blocking member under the action of said spring whereby during movement of said counter means in said translatory movement under the action of said wind-up means to said initial position, said blocking member engaging said counter elements resiliently yields.

30. An apparatus as set forth in claim 20 wherein said counter means include a body having a top plate and a bottom plate, said bottom plate having a wind-up portion; and wherein said wind-up means include a wind-up bar extending in a direction of movement of said carriage under said wind-up portion; and drive means for operating said wind-up bar to engage said wind-up portion for moving said counter means to said initial position whereby said biassing means is wound up.

31. An apparatus as set forth in claim 30 and including a rotary actuating member and linkage means connecting said rotary actuating member with said windup bar for operating the same.

32. An apparatus as set forth in claim 31 wherein said linkage means include arm means supporting said wind-up bar, a roller connected to said arm means, a cam member having a cam face cooperating with said roller, and a lever connected to said cam member and operated by said rotary actuating member to shift said cam member for raising and lowering said wind-up bar.

33. An apparatus as set forth in claim 30 wherein said rotary actuating member includes a roller cooperating with said lever; and including a stop for said lever, and spring means acting on said lever to hold the same against said stop until displaced by said roller.

34. An apparatus as set forth in claim 33 and including a rockable sensing member having a normal position and an angularly displaced position, said counter means having a portion blocking movement of said sensing member to said displaced position when said counter means has moved under the action of said biassing means in said translatory movement to an end position so that in said end position said rockable sensing member cannot turn to said displaced position, said rockable sensing member having a slot; and wherein said cam member has a pin located in said slot so that during movement of said cam member said slot guides said pin and thereby said cam member to a position for raising said arm means with said wind-up bar only if said counter means blocks rocking movement of said rockable sensing member to said displaced position, whereas in other positions of said counter means, said sensing member rocks to said displaced position and said pin guides said cam member to move in a direction which will not cause wind-up of said counter means.

35. An apparatus as set forth in claim 34 and including locking means for locking said cam member when said pin is guided by said slot in said displaced position of said rockable sensing member.

36. An apparatus as set forth in claim 35 wherein said locking means include a locking projection on said cam member, said rocking projection having a slanted face, and means for guiding said slanted face and thereby said cam member when said rockable sensing member is blocked by said counter means.

37. An apparatus as set forth in claim 36 wherein said guide means include a guide plate, a means for adjusting the position of said guide plate in relation to said slanted face of said locking portion.

References Cited
UNITED STATES PATENTS

| | | | |
|---|---|---|---|
| 2,821,342 | 1/1958 | Capellare | 235—60 |
| 2,992,773 | 7/1961 | Capellare et al. | 235—60 |
| 3,001,701 | 9/1961 | Frobel | 235—60 |
| 3,005,585 | 10/1961 | Capellare et al. | 235—60 |
| 3,223,318 | 12/1965 | Gassine | 235—60 |

RICHARD B. WILKINSON, *Primary Examiner.*

S. A. WAL, *Assistant Examiner.*